US012598394B2

(12) United States Patent
Fu

(10) Patent No.: US 12,598,394 B2
(45) Date of Patent: Apr. 7, 2026

(54) IMAGE PROCESSING METHOD AND APPARATUS, AND ELECTRONIC DEVICE

(71) Applicant: VIVO MOBILE COMMUNICATION CO., LTD., Guangdong (CN)

(72) Inventor: Jun Fu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 216 days.

(21) Appl. No.: 18/325,682

(22) Filed: May 30, 2023

(65) Prior Publication Data

US 2023/0300475 A1 Sep. 21, 2023

Related U.S. Application Data

(63) Continuation of application No. PCT/CN2021/134216, filed on Nov. 30, 2021.

(30) Foreign Application Priority Data

Nov. 30, 2020 (CN) .......................... 202011380615.3

(51) Int. Cl.
*H04N 23/80* (2023.01)
*H04N 23/63* (2023.01)

(52) U.S. Cl.
CPC ............. *H04N 23/80* (2023.01); *H04N 23/63* (2023.01)

(58) Field of Classification Search
CPC ...... H04N 23/80; H04N 23/63; H04N 5/2621; H04N 23/62; H04N 23/72; H04N 23/741;
(Continued)

(56) References Cited

U.S. PATENT DOCUMENTS

2010/0271498 A1 10/2010 Hwang et al.
2013/0021505 A1 1/2013 Plowman et al.
(Continued)

FOREIGN PATENT DOCUMENTS

CN 107509038 A 12/2017
CN 109167915 A 1/2019
(Continued)

OTHER PUBLICATIONS

Extended European Search Report for Application No. 21897217.2, dated Apr. 9, 2024, 9 Pages.
(Continued)

*Primary Examiner* — Lin Ye
*Assistant Examiner* — Tuan H Le
(74) *Attorney, Agent, or Firm* — BROOKS KUSHMAN P.C.

(57) ABSTRACT

An image processing method and apparatus, and an electronic device are provided, belonging to the field of image processing technologies. The method includes: obtaining, through an image sensor, an image acquired in real time; determining a to-be-stored image and a to-be-previewed image through a central processing chip according to the image acquired in real time; performing enhancement processing on the to-be-stored image and the to-be-previewed image through an image processing chip; and storing the image obtained after the enhancement processing through a memory, and displaying the to-be-previewed image obtained after the enhancement processing on a display screen.

14 Claims, 3 Drawing Sheets

(58) Field of Classification Search
CPC ........ H04N 23/632; H04N 23/81; H04N 5/77;
H04N 5/9261; H04N 23/54; G06T 5/00
See application file for complete search history.

(56) References Cited

U.S. PATENT DOCUMENTS

| 2013/0120618 | A1* | 5/2013 | Wang ..................... H04N 23/69 |
| | | | 348/240.99 |
| 2013/0222671 | A1 | 8/2013 | Tseng et al. |
| 2015/0062436 | A1 | 3/2015 | An et al. |
| 2020/0020087 | A1 | 1/2020 | Douady-Pleven et al. |
| 2020/0221008 | A1 | 7/2020 | Gandhi et al. |
| 2021/0235011 | A1 | 7/2021 | Zhao et al. |
| 2021/0289137 | A1* | 9/2021 | Ozone .................... H04R 3/005 |
| 2022/0006960 | A1 | 1/2022 | Kim et al. |

FOREIGN PATENT DOCUMENTS

| CN | 11699511 | A | 9/2020 |
| CN | 112565603 | A | 3/2021 |
| EP | 3806444 | A1 | 4/2021 |
| KR | 20120008062 | A | 1/2012 |
| WO | 2019232969 | A1 | 12/2019 |

OTHER PUBLICATIONS

First Office Action for Chinese Application No. 202011380615.3, dated Nov. 2, 2021, 6 Pages.
International Search Report and Written Opinion for Application No. PCT/CN2021/134216, dated Feb. 15, 2022, 7 Pages.
Second European Office Action for European Patent Application No. 21897217.2 mailed Jul. 10, 2025. 6 pages.
Korean Office Action for Korean Patent Application No. 10-2023-7022064 dated Jan. 20, 2025. 12 pages.

* cited by examiner

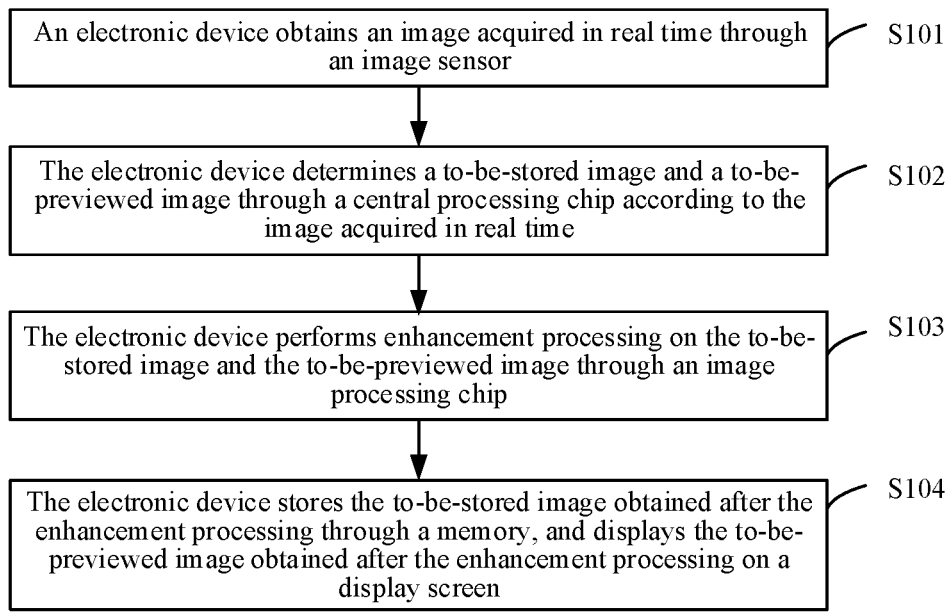

| | |
|---|---|
| An electronic device obtains an image acquired in real time through an image sensor | S101 |
| The electronic device determines a to-be-stored image and a to-be-previewed image through a central processing chip according to the image acquired in real time | S102 |
| The electronic device performs enhancement processing on the to-be-stored image and the to-be-previewed image through an image processing chip | S103 |
| The electronic device stores the to-be-stored image obtained after the enhancement processing through a memory, and displays the to-be-previewed image obtained after the enhancement processing on a display screen | S104 |

FIG. 1

FIG. 2

IMAGE PROCESSING METHOD AND APPARATUS, AND ELECTRONIC DEVICE

CROSS-REFERENCE TO RELATED APPLICATIONS

This application is a continuation of International Application No. PCT/CN2021/134216 filed on Nov. 30, 2021, which claims priority to Chinese Patent Application No. 202011380615.3 filed on Nov. 30, 2020, which are incorporated herein by reference in their entireties.

TECHNICAL FIELD

This application relates to the field of image processing technologies, and specifically, to an image processing method and apparatus, and an electronic device.

BACKGROUND

With the development of communication technologies, functions of electronic devices are becoming more and more powerful. For example, a user can use an electronic device to shoot videos.

Generally, in a dark environment, due to limitations of a camera sensor and an image signal processor (ISP), the user cannot achieve ideal shooting effects using the electronic device. At present, an effect of improving brightness can be achieved by changing a color filter array of the camera sensor, that is, by increasing the luminous flux of the sensor.

However, in the foregoing method, a change of a camera hardware structure may lead to color deviation in a final generated image, resulting in poor quality of images taken by the electronic device.

SUMMARY

Embodiments of this application are aimed to provide an image processing method, an apparatus, and an electronic device.

According to a first aspect, an embodiment of this application provides an image processing method, including: obtaining, through an image sensor, an image acquired in real time; determining a to-be-stored image and a to-be-previewed image through a central processing chip according to the image acquired in real time; performing enhancement processing on the to-be-stored image and the to-be-previewed image through an image processing chip; and storing the to-be-stored image obtained after the enhancement processing through a memory, and displaying the to-be-previewed image obtained after the enhancement processing on a display screen.

According to a second aspect, an embodiment of this application provides an image processing apparatus, including: an image sensor, configured to obtain an image acquired in real time; a central processing chip, configured to determine a to-be-stored image and a to-be-previewed image according to the image acquired in real time; an image processing module, configured to perform enhancement processing on the to-be-stored image and the to-be-previewed image; a memory, configured to store the to-be-stored image obtained after the enhancement processing; and a display screen, configured to display the to-be-previewed image obtained after the enhancement processing.

According to a third aspect, an embodiment of this application provides an electronic device, including a processor, a memory, and a program or instructions stored in the memory and executable on the processor, the program or the instructions, when executed by the processor, implementing steps of the method according to the first aspect.

According to a fourth aspect, an embodiment of this application provides a readable storage medium, storing a program or instructions, the program or the instructions, when executed by a processor, implementing steps of the method according to the first aspect.

According to a fifth aspect, an embodiment of this application provides a chip, including a processor and a communication interface, where the communication interface is coupled to the processor, and the processor is configured to run a program or instructions, to implement the method according to the first aspect.

According to a sixth aspect, an embodiment of this application provides a computer program product, the program product, when executed by at least one processor, being configured to perform the method according to the first aspect.

In the embodiments of this application, in the process of acquiring the image, the electronic device can obtain the image acquired in real time through the image sensor, and then determine the to-be-stored image and the to-be-previewed image (that is, two channels of images) through the central processing chip according to the image acquired in real time, and then before storing the to-be-stored image in the memory and displaying the to-be-previewed image on the display screen, the enhancement processing can be performed on the to-be-stored image and the to-be-previewed image through the image processing chip first, then the image obtained after the enhancement processing can be stored in the memory of the electronic device, and the image obtained after the enhancement processing can be displayed on the display screen of the electronic device. The enhancement processing is performed through the image processing chip before the image is stored and displayed. Therefore, in the process of acquiring the image by using the image processing method of this application, in one aspect, the enhanced processing is distributed to other chips other than the central processing chip, which can reduce the power consumption of the central processing chip of the electronic device without the need to change a hardware structure of a camera. In another aspect, before storing the acquired image, the quality of the stored image can be improved by software processing. Before displaying the acquired image, the display effect of the displayed image can also be improved by software processing. For example, in a case of shooting videos at night, the problem of poor quality of video images taken at night can be improved.

BRIEF DESCRIPTION OF THE DRAWINGS

FIG. 1 is a schematic flowchart of an image processing method according to an embodiment of this application;

FIG. 2 is a schematic diagram of a capture preview interface according to an embodiment of this application;

DETAILED DESCRIPTION

Figure 3:
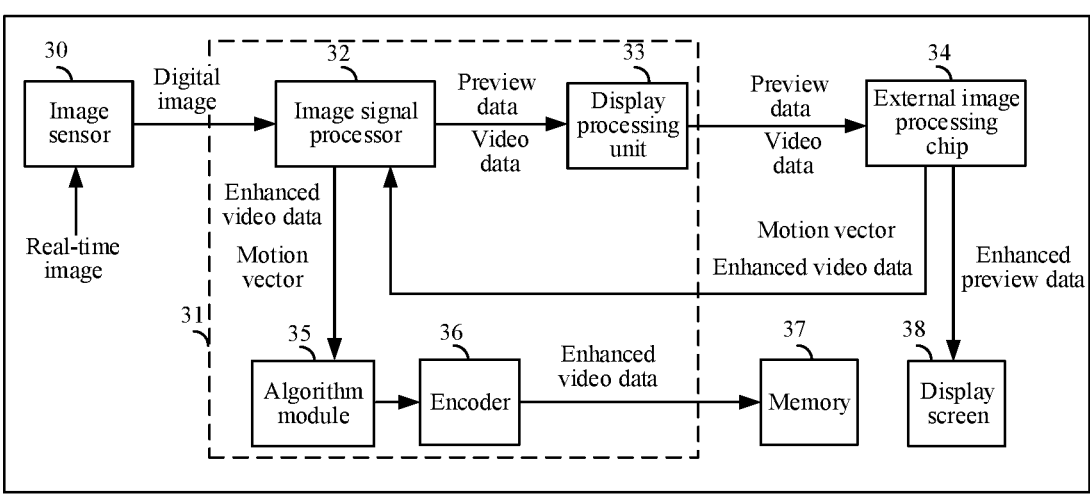
FIG. 3 is a schematic structural diagram of an electronic device according to an embodiment of this application.

The following clearly and completely describes the technical solutions in the embodiments of this application with reference to the accompanying drawings in the embodiments of this application. Apparently, the described embodiments are some embodiments of this application rather than all of the embodiments. All other embodiments obtained by a person of ordinary skill in the art based on the embodiments of this application without creative efforts shall fall within the protection scope of this application.

The specification and claims of this application, and terms "first" and "second" are used to distinguish similar objects, but are unnecessarily used to describe a specific sequence or order. It should be understood that the data in such a way are interchangeable in proper circumstances, so that the embodiments of this application can be implemented in other orders than the order illustrated or described herein. Objects distinguished by "first", "second", and the like are usually one type, and the number of objects is not limited. For example, the first object may be one or more than one. In addition, in the specification and the claims, "and/or" means at least one of the connected objects, and the character "I" generally indicates an "or" relationship between the associated objects.

An image processing method provided in the embodiments of this application is described below through specific embodiments and application scenarios thereof with reference to the accompanying drawings.

FIG. 1 is a schematic flowchart of an image processing method according to an embodiment of this application. As shown in FIG. 1, the method includes steps S101 to S104.

S101: An electronic device obtains an image acquired in real time through an image sensor.

The image may include a static image and a dynamic image, that is, acquiring the image in real time may be that taking a static photo, a dynamic image, or a video.

For example, the electronic device may convert the acquired real-time image into a digital image after acquiring the real-time image, and then conduct post-processing on the digital image.

S102: The electronic device determines a to-be-stored image and a to-be-previewed image through a central processing chip according to the image acquired in real time.

For example, the electronic device can determine to-be-stored image data and to-be-previewed image data according to the digital image converted from the image acquired in real time.

S103: The electronic device performs enhancement processing on the to-be-stored image and the to-be-previewed image through an image processing chip.

It should be noted that, in this embodiment of this application, the enhancement processing can improve the display quality of the acquired image.

Optionally, in this embodiment of this application, the enhancement processing may include at least one of the following: dynamic range improvement, brightening, noise reduction, frame insertion, and super resolution.

For a real scene, a dynamic range refers to a ratio of the brightness of a brightest part to a darkest part of the scene, and extends the dynamic range of a digital imaging system, that is, the high-dynamic range (HDR) imaging technology, which refers to the use of hardware or software methods to make an output image contain as large a range of scene brightness as possible, and accurately reproduce the true details of the scene.

Generally, a digital image in reality is often affected by the interference of imaging device and external environment noise in the process of digitization and transmission, that is, the digital image is a noisy image (or noise contained image). The process of reducing noise in the digital image is referred to as image denoising.

Frame insertion is a process of generating a series of intermediate frames between an inputting image a and an inputting image b. The smoothness of a video image can be improved through inserting a frame into the video image.

Super resolution can effectively improve the video display resolution and make a low-resolution video obtain a high-resolution display experience.

Optionally, the enhancement processing on an image previewed in real time may be exactly the same as the specific processing of the enhancement processing on the to-be-stored image, and can may be partially the same or different. This embodiment of this application does not specifically limit this.

S104: The electronic device stores the to-be-stored image obtained after the enhancement processing through a memory, and displays the to-be-previewed image obtained after the enhancement processing on a display screen.

That is to say, in this embodiment of this application, the image stored by the electronic device may be an image after the foregoing enhancement processing. That is, a user can find the image obtained after the enhancement processing and video obtained after the enhancement processing in the electronic device.

FIG. 2 is a schematic diagram of a capture preview interface according to an embodiment of this application. The user can acquire a video image in this interface. After the electronic device performs the enhancement processing on the preview image, the preview image obtained after the enhancement processing may be displayed in this preview interface.

For the image processing method provided in the embodiments of this application, in the process of acquiring the image, the electronic device can obtain the image acquired in real time through the image sensor, and then determine the to-be-stored image and the to-be-previewed image (that is, two channels of images) through the central processing chip according to the image acquired in real time, and then before storing the to-be-stored image in the memory and displaying the to-be-previewed image on the display screen, the enhancement processing can be performed on the to-be-stored image and the to-be-previewed image through the image processing chip first, then the image obtained after the enhancement processing can be stored in the memory of the electronic device, and the image obtained after the enhancement processing can be displayed on the display screen of the electronic device. The enhancement processing is performed through the image processing chip before the image is stored and displayed. Therefore, in the process of acquiring the image by using the image processing method of this application, in one aspect, the enhanced processing is distributed to other chips other than the central processing chip, which can reduce the power consumption of the central processing chip of the electronic device without the need to change a hardware structure of a camera. In another aspect, before storing the acquired image, the quality of the stored image can be improved by software processing. Before displaying the acquired image, the display effect of the displayed image can also be improved by software processing. For example, in a case of shooting videos at night, the problem of poor quality of video images taken at night can be improved.

Optionally, the central processing chip includes an image signal processor. For the image processing method provided in this embodiment of this application, S102 can be implemented through the following S102a.

S102a: The electronic device performs first processing on the image acquired in real time through an image signal processor, to generate the to-be-stored image and the to-be-previewed image.

For example, the first processing may be that the electronic device transmits the same image data collected in real time to a display module and a storage module respectively. Alternatively, the image data can be copied into two copies of image data, one for storage and one for display.

For example, the electronic device can separate the digital image into two channels of video image data. A first channel of video image data is a video image for preview, and a second channel of video image data is a video image for storage.

Based on this solution, the electronic device can separate the image data for preview and the image data stored by the user from the image acquired in real time after obtaining the image acquired in real time, so as to facilitate the subsequent post-processing on image data for different purposes.

Optionally, the central processing chip includes an algorithm module. The image processing method provided in this embodiment of this application may further include the following S105 and S106.

S105: The electronic device generates a motion vector of the to-be-stored image through the image processing chip.

For example, in the process of performing enhancement processing on the to-be-previewed image and the to-be-stored image in real time, the electronic device can generate and output a motion vector MV corresponding to each frame of image.

S106: The electronic device performs second processing on the to-be-stored image obtained after the enhancement processing through an algorithm module according to the motion vector.

For example, the electronic device can use the motion vector MV to perform data enhancement (that is, second processing) on the image obtained after the enhancement processing again, and perform other image processing to make the display effect of the image better.

Based on this solution, the electronic device can obtain the motion vector of the each frame of image during the process of image enhancement processing, which can prepare for the electronic device to continue other image processing, without additional processing by the electronic device to obtain the motion vector, reducing the complexity of the electronic device to process the image.

Optionally, the central processing chip includes an encoder. In the image processing method provided in this embodiment of this application, the "to-be-stored image obtained after the enhancement processing is stored in the memory" in S104 may be specifically implemented through the following S104a.

S104a: The electronic device encodes the to-be-stored image obtained after the enhancement processing through the encoder, and stores the encoded to-be-stored image in the memory.

The encoder is a video encoder or a picture encoder.

Based on this solution, the electronic device can use the picture encoder to encode the to-be-stored image obtained after the enhancement processing in the process of taking the static image, so as to obtain a picture with better display effect. In the process of shooting videos, the video encoder can be used to encode the to-be-stored video obtained after the enhancement processing, so that a video with better display effect can be obtained.

FIG. 3 is a schematic structural diagram of an electronic device according to an embodiment of this application. As shown in FIG. 3, an image sensor 30, a central processing chip 31, an external image processing chip 34, a memory 37, and a display screen 38 may be included. The central processing chip 31 includes: an image signal processor 32, a display processing unit 33, an algorithm module 35, and an encoder 36.

(1) Image Sensor 30

The image sensor 30 is configured to acquire a real-time screen to obtain an image acquired in real time, and convert the image acquired in real time into a digital signal, that is, a digital image. Then the converted digital image can be transmitted to the image signal processor 32 in the central processing chip 31 through the mobile industry processor interface-camera serial interface (MIPI CSI).

(2) Image Signal Processor 32

The image signal processor 32 is configured to perform post-processing on the digital image. The image signal processor performs image processing and color conversion on an original RAW image, and outputs to-be-previewed image data and to-be-stored image data in YUV format. In a process of screen capture, the image data is picture data; and in a process of screen recording, the image data is video data. For example, in the process of screen recording, two channels of images can be generated according to the digital image sent by the image sensor 30 through MIPI CSI, one is the to-be-previewed video image (recorded as preview data in FIG. 3), and the other is the to-be-stored video image (recorded as video data in FIG. 3). The image signal processor 32 transmits two channels of digital images to the external image processing chip 34 separately through the display processing unit.

The display processing unit is configured to: convert an image data into RGB data, and send the RGB data to an external display device.

(3) External Image Processing Chip 34

The external image processing chip 34 is configured to perform enhancement processing on the two channels of digital images sent by the image signal processor 32 through the MIPI DSI interface of the display processing unit 33, to generate and output the motion vector MV corresponding to each frame of image.

For example, enhancement processing on digital images includes enhancement processing on the to-be-previewed video image (preview data) and enhancement processing on the to-be-stored video image (video data).

Optionally, the enhancement processing includes: image processing such as brightening, improving dynamic range, noise reduction, frame insertion, super resolution, sharpening, clipping, color correction, and the like.

The external image processing chip 34 can transmit the preview data obtained after the enhancement processing to the display screen 38 through the MIPI display serial interface (DSI).

The external image processing chip 34 can transmit the motion vector MV and the video data obtained after the enhancement processing back to the image signal processor 32 through the MIPI CSI. The image signal processor 32 then transmits the motion vector MV and the video data obtained after the enhancement processing to the algorithm module 35 for post-processing.

The DSI is a high-speed serial interface located between the processor and the display module. The CSI is a high-speed serial interface located between the processor and the camera module.

In this embodiment of this application, the algorithm module 35 may include a target algorithm for the second processing on the enhanced video data according to the motion vector transmitted by the image signal processor.

(4) Display Screen 38

The display screen 38 may be a liquid crystal display (LCD), configured to receive the preview data obtained after the enhancement processing transmitted by the external image processing chip 34 and display the received to-be-previewed image obtained after the enhancement processing.

(5) Algorithm Module 35

The algorithm module 35 is configured to perform second processing (other data enhancement) on the data image. For example, noise reduction and other processing are performed again.

Receive the motion vector MV transmitted by the image signal processor 32 and the video data obtained after the enhancement processing, and perform other data enhancement on the video data obtained after the enhancement processing according to the motion vector MV.

It should be noted that, the algorithm module may be a separate module or a module integrated in the image signal processor 32. This embodiment of this application does not specifically limit this.

(6) Encoder 36

The encoder 36 may be an image encoder, a video encoder, or an encoder including image encoding and video encoding. The encoder 36 is configured to encode the image data.

For example, the video data obtained after the enhancement processing transmitted by the algorithm module 35 is received, then the video data obtained after the enhancement processing is encoded, and then transmitted to the memory 37.

It should be noted that, in a case that the electronic device does not perform second processing on the video data obtained after the enhancement processing, the image signal processor can directly transmit the video data obtained after the enhancement processing to the encoder after receiving the enhanced video data.

(7) Memory 37

The memory 37 is configured to store the encoded video data transmitted by the video encoder 36.

The memory 37 may be an embedded multi-media card (EMMC) or a Flash Memory.

Based on this solution, the electronic device can perform enhancement processing on the image data through the external image processing chip after acquiring the image data and before encoding and storing the acquired image in a scene of taking the image, and perform enhancement processing on the to-be-previewed image data, which can make the display effect better on the display screen. Performing enhancement processing on the to-be-stored image data can make the display effect of the stored image better. An external image processing chip is used for enhancement processing, on the one hand, the power consumption of the central processing chip of the electronic device can be reduced by distributing the enhancement processing to other chips other than the central processing chip. On the other hand, the external image processing chip is used for enhancement processing of the acquired image, which improves the poor quality of the taken image without changing the hardware structure of the camera of the electronic device, thereby reducing costs.

It should be noted that, the image processing method provided in this embodiment of this application may be executed by an image processing apparatus, or a control module for executing the video image processing method in the image processing apparatus. In this embodiment of this application, a method of performing a video image processing by the image processing apparatus is taken as an example to illustrate the video image processing apparatus provided in this embodiment of this application.

Figure 4:
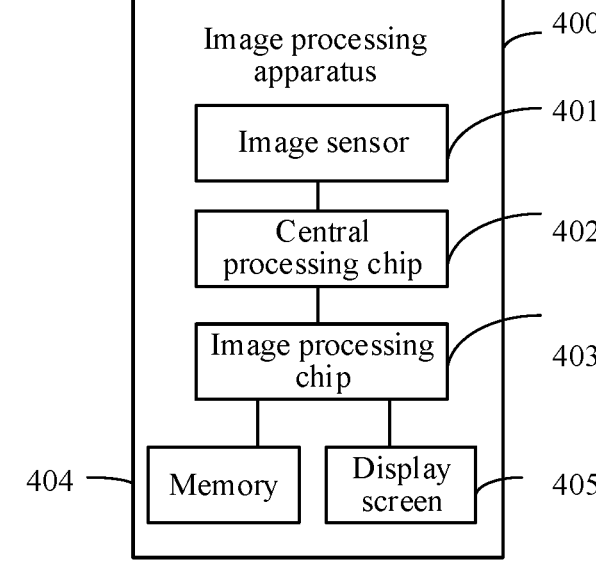
FIG. 4 is a possible schematic diagram of an image processing apparatus according to an embodiment of this application.

FIG. 4 is a schematic structural diagram of an image processing apparatus according to an embodiment of this application. Referring to FIG. 4, an image processing apparatus 400 includes: an image sensor 401, configured to obtain an image acquired in real time; a central processing chip 402, configured to determine a to-be-stored image and a to-be-previewed image according to the image acquired in real time; an image processing chip 403, configured to perform enhancement processing on the to-be-stored image and the to-be-previewed image; a memory 404, configured to store a to-be-stored video image obtained after the enhancement processing; and a display screen 405, configured to display the to-be-previewed image obtained after the enhancement processing.

Optionally, the central processing chip includes: an image signal processor, configured to perform first processing on the image acquired in real time, to generate the to-be-stored image and the to-be-previewed image.

Optionally, the image processing chip is further configured to generate a motion vector of the to-be-stored image; and the central processing chip includes: an algorithm module, configured to perform second processing on the to-be-stored image obtained after the enhancement processing according to the motion vector.

Optionally, the central processing chip includes an encoder, and the encoder is configured to encode the to-be-stored image obtained after the enhancement processing; and the memory is specifically configured to: store the encoded to-be-stored image in the memory, where the encoder is a video encoder or a picture encoder.

Optionally, the enhancement processing includes at least one of the following: dynamic range improvement, brightening, noise reduction, frame insertion, and super resolution.

The image processing apparatus in the embodiments of this application, in the process of acquiring the image, can obtain the image acquired in real time through the image sensor, and then determine the to-be-stored image and the to-be-previewed image (that is, two channels of images) through the central processing chip according to the image acquired in real time, and then before storing the to-be-stored image in the memory and displaying the to-be-previewed image on the display screen, the enhancement processing can be performed on the to-be-stored image and the to-be-previewed image through the image processing chip first, then the image obtained after the enhancement processing can be stored in the memory of the image processing apparatus, and the image obtained after the enhancement processing can be displayed on the display screen of the image processing apparatus. The enhancement processing is performed through the image processing chip before the image is stored and displayed. Therefore, in the process of acquiring the image by using the image processing method of this application, in one aspect, the enhanced processing is distributed to other chips other than the central processing chip, which can reduce the power consumption of the central processing chip of the image processing apparatus without the need to change a hardware structure of a camera. In another aspect, before storing the acquired mage, the quality of the stored image can be improved by software processing. Before displaying the acquired image, the display effect of the displayed image can also be improved by software processing. For example, in a case of shooting videos at night, the problem of poor quality of video images taken at night can be improved.

The image processing apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a laptop computer, a handheld computer, an on-board electronic device, a wearable device, an ultra-mobile personal computers (UMPC), a netbook, or a personal digital assistant (PDA), and the non-mobile electronic device may be server, a network attached storage (NAS) a personal computer (PC), a television (TV), a teller machine, a self-service machine, or the like, which are not specifically limited in this embodiment of this application.

The image processing apparatus in this embodiment of this application may be an apparatus having an operating system. The operating system may be an Android operating system, an ios operating system, or other possible operating system. This embodiment of this application is not specifically limited.

The image processing apparatus provided in this embodiment of this application can implement all processes implemented by the image processing apparatus in the method embodiments of FIG. 1 to FIG. 3. To avoid repetition, details are not described herein again.

Figure 5:
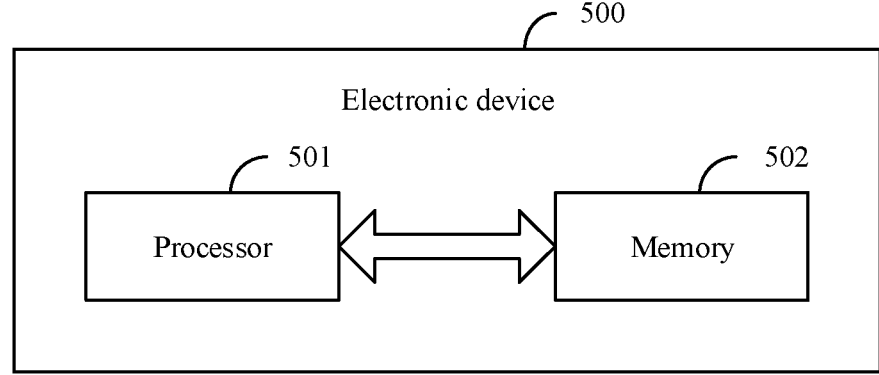
FIG. 5 is a possible schematic structural diagram of an electronic device according to an embodiment of this application.

Optionally, as shown in FIG. 5, an embodiment of this application further provides an electronic device 500, including a processor 501, a memory 502, and a program or instructions stored in the memory 502 and runnable on the processor 501. The program or the instructions, when executed by the processor 501, implements all processes of the embodiments of the foregoing image processing method, and can achieve the same technical effects. To avoid repetition, details are not described herein again.

It should be noted that, the electronic device in this embodiment of this application includes the foregoing mobile electronic device and the non-mobile electronic device.

Optionally, an embodiment of this application further provides an electronic device, including: an image sensor, a central processing chip, an image processing chip, a memory, and a display screen. The image sensor is configured to obtain an image acquired in real time; the central processing chip is configured to determine a to-be-stored image and a to-be-previewed image according to the image acquired in real time; the image processing chip is configured to perform enhancement processing on the to-be-stored image and the to-be-previewed image; the memory is configured to store the to-be-stored image obtained after the enhancement processing; and the display screen is configured to display the to-be-previewed image obtained after the enhancement processing.

Figure 6:
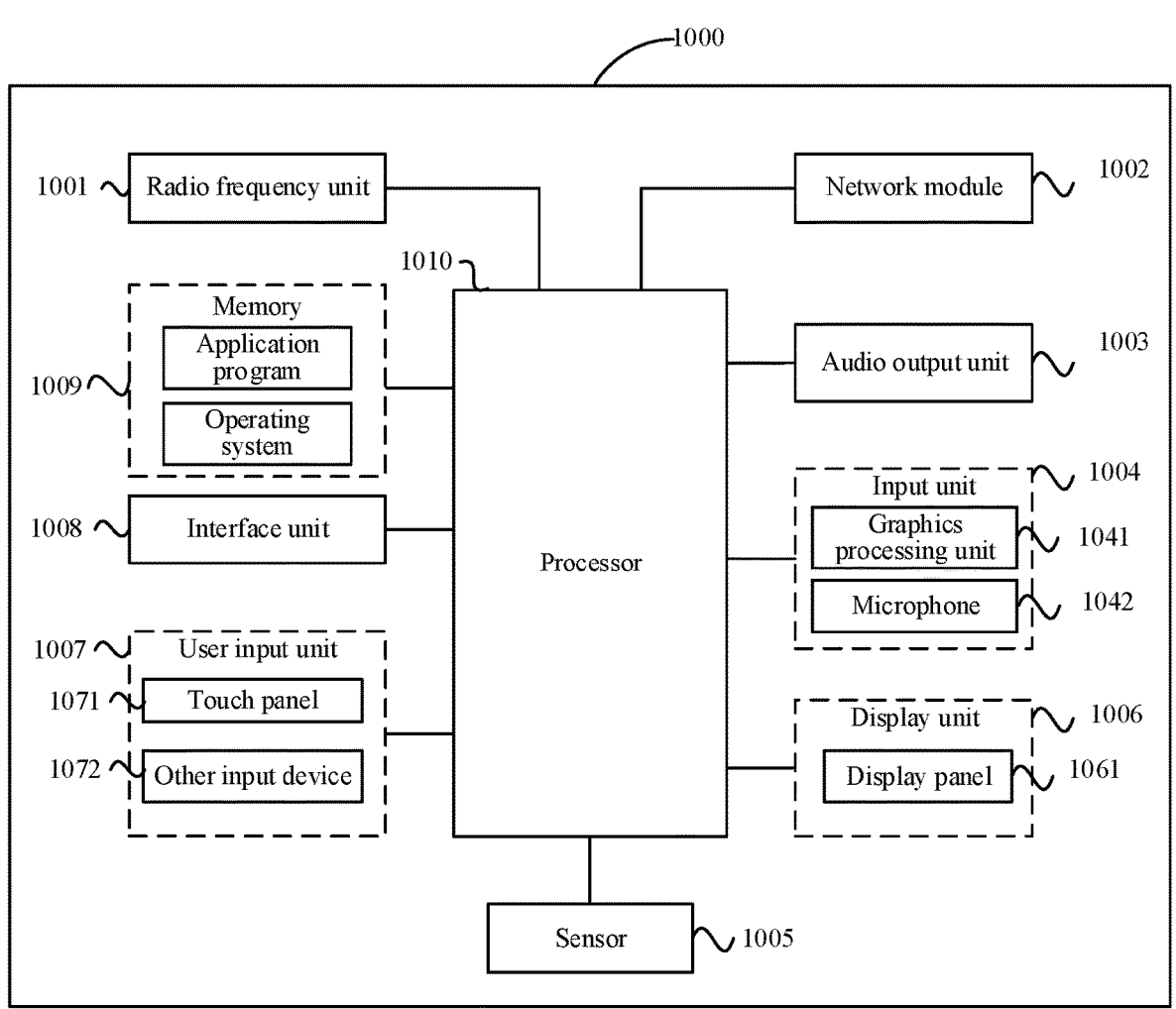
FIG. 6 is a schematic diagram of a hardware of an electronic device according to an embodiment of this application.

FIG. 6 is a schematic diagram of a hardware structure of an electronic device that implements the embodiments of this application.

The electronic device 1000 includes but is not limited to: components such as a radio frequency unit 1001, a network module 1002, an audio output unit 1003, an input unit 1004, a sensor 1005, a display unit 1006, a user input unit 1007, an interface unit 1008, a memory 1009, and a processor 1010.

It should be noted that, the sensor 1005 can realize a function of the image sensor 401, the processor 1010 can realize a function of the central processing chip 402, and the display unit 1006 can realize a function of the display screen 404.

Optionally, the electronic device 1000 may further include an external image processing chip, configured to realize a function of the image processing chip 403.

Optionally, the processor 1010 can realize the functions of the central processing chip and the external image processing chip.

A person skilled in the art may understand that the electronic device 1000 further includes a power supply (such as a battery) for supplying power to the components. The power supply may logically connect to the processor 1010 by using a power supply management system, thereby implementing functions, such as charging, discharging, and power consumption management, by using the power supply management system. The structure of the electronic device shown in FIG. 6 constitutes no limitation on the electronic device, and the electronic device may include more or fewer components than those shown in the figure, or some components may be combined, or a different component deployment may be used. Details are not described herein again.

The sensor 1005 is configured to obtain an image acquired in real time and a to-be-previewed image; the processor 1010 is configured to determine a to-be-stored image according to the image acquired in real time; the external image processing chip performs enhancement processing on the to-be-stored image and the to-be-previewed image; the memory 1009 is configured to store a to-be-stored video image obtained after the enhancement processing; and the display unit 1006 is configured to display the to-be-previewed image obtained after the enhancement processing.

The embodiments of this application provide an electronic device, in the process of acquiring the image, the electronic device can obtain the image acquired in real time through the sensor, and then determine the to-be-stored image and the to-be-previewed image (that is, two channels of images) through the processor according to the image acquired in real time, and then before storing the to-be-stored image in the memory and displaying the to-be-previewed image on the display screen, enhancement processing can be performed on the to-be-stored image and the to-be-previewed image through the external image processing chip first, then the image obtained after the enhancement processing can be stored in the memory of the electronic device, and the image obtained after the enhancement processing can be displayed on the display screen of the electronic device. The enhancement processing is performed through the image processing chip before the image is stored and displayed. Therefore, in the process of acquiring the image by using the image processing method of this application, in one aspect, the enhanced processing is distributed to other chips other than the processor, which can reduce the power consumption of the processor of the electronic device without the need to change a hardware structure of a camera. In another aspect, before storing the acquired image, the quality of the stored image can be improved by software processing. Before displaying the acquired image, the display effect of the displayed image can also be improved by software processing. For example, in a case of shooting videos at night, the problem of poor quality of video images taken at night can be improved.

Optionally, the processor 1010 (that is, central processing chip) includes: an image signal processor, configured to perform first processing on the image acquired in real time, to generate the to-be-stored image and the to-be-previewed image.

Optionally, the external image processing chip is further configured to generate a motion vector of the to-be-stored image; and the processor (that is, central processing chip) includes: an algorithm module, configured to perform second processing on the to-be-stored image obtained after the enhancement processing according to the motion vector.

Optionally, the processor 1010 (central processing chip) includes an encoder, and the encoder is configured to encode the to-be-stored image obtained after the enhancement processing; and the memory 1009 is specifically configured to: store the encoded to-be-stored image in the memory, where the encoder is a video encoder or a picture encoder.

Optionally, the enhancement processing includes at least one of the following: dynamic range improvement, brightening, noise reduction, frame insertion, and super resolution.

It should be understood that, in this embodiment of this application, the input unit 1004 may include a graphics processing unit (GPU) 1041 and a microphone 1042. The graphics processing unit 1041 performs processing on image data of a static picture or a video that is obtained by an image acquisition apparatus (for example, a camera) in a video acquisition mode or an image acquisition mode. The display unit 1006 may include a display panel 1061, for example, the display panel 1061 may be configured in a form such as a liquid crystal display or an organic light-emitting diode. The user input unit 1007 includes a touch panel 1071 and another input device 1072. The touch panel 1071 is also referred to as a touch screen. The touch panel 1071 may include two parts: a touch detection apparatus and a touch controller. The another input device 1072 may include, but is not limited to, a physical keyboard, a functional key (such as a volume control key or a switch key), a track ball, a mouse, and a joystick, which is not described herein in detail again. The memory 1009 may be configured to store a software program and various data, and includes, but is not limited to an application program and an operating system. The processor 1010 may integrate an application processor and a modem. The application processor mainly processes an operating system, a user interface, an application program, and the like. The modem mainly processes wireless communication. It can be understood that, the modem processor may not be integrated into the processor 1010.

An embodiment of this application further provides a readable storage medium, storing a program or instructions. The program or the instructions, when executed by a processor, implements all processes of the embodiments of the foregoing image processing method, and can achieve the same technical effects. To avoid repetition, details are not described herein again.

The processor is a processor in the foregoing electronic device in the foregoing embodiments. The readable storage medium includes a computer-readable storage medium, for example, a computer read-only memory (ROM), a random access memory (RAM), a magnetic disk, or an optical disc.

An embodiment of this application further provides a chip, including: a processor and a communication interface, where the communication interface is coupled to the processor, and the processor is configured to run a program or instructions, to implement all processes of the embodiments of the foregoing image processing method, and can achieve the same technical effects. To avoid repetition, details are not described herein again.

It should be noted that, the chip mentioned in the embodiments of this application may also be referred to as a system-level chip, a system chip, a chip system, a system on chip, or the like.

This embodiment of this application further provides a computer program product, the computer program product being stored in a non-volatile storage medium. The program product is executed by at least one processor to realize all processes of the foregoing image processing method embodiment, and can achieve the same technical effect. To avoid repetition, details are not described herein again.

It should be noted that, in this specification, "include", "comprise", and any variants are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. Without more limitations, elements defined by the sentence "comprising one" does not exclude that there are still other same elements in the processes, methods, objects, or apparatuses. In addition, it should be pointed out that the scope of the methods and apparatuses in the embodiments of this application is not limited to performing the functions in the order shown or discussed, but also can include performing the functions in basically the same way or in the opposite order according to the functions involved, for example, the described methods can be performed in a different order from the described ones, and various steps can also be added, omitted, or combined. In addition, features described with reference to some examples may be combined in other examples.

Through the foregoing description on the implementations, a person skilled in the art can clearly learn that the foregoing embodiment methods may be implemented by using software in combination with a necessary universal hardware platform. Certainly, the embodiment methods may also be implemented by using hardware, but the former is a better implementation in many cases. Based on such an understanding, the technical solutions in this application essentially or the part contributing to the existing technologies may be implemented in the form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this application.

The embodiments of this application have been described above with reference to the accompanying drawings. This application is not limited to the specific embodiments described above, and the specific embodiments described above are merely exemplary and not limitative. Those of ordinary skill in the art may make various variations under the teaching of this application without departing from the spirit of this application and the protection scope of the claims, and such variations shall all fall within the protection scope of this application.

What is claimed is:

1. An image processing method, comprising:

obtaining, through an image sensor, an image acquired in real time;

determining a to-be-stored image and a to-be-previewed image through a central processing chip according to the image acquired in real time;

performing enhancement processing on the to-be-stored image and the to-be-previewed image through an image processing chip, wherein the image processing chip is external to the central processing chip; and storing the to-be-stored image obtained after the enhancement processing through a memory, and displaying the to-be-previewed image obtained after the enhancement processing on a display screen;

wherein the central processing chip comprises an image signal processor, and the determining a to-be-stored image and a to-be-previewed image through a central processing chip according to the image acquired in real time comprises:

performing first processing on the image acquired in real time through the image signal processor, to generate the to-be-stored image and the to-be-previewed image.

2. The method according to claim 1, wherein the central processing chip comprises an algorithm module, and the method further comprises:

generating a motion vector of the to-be-stored image through the image processing chip; and performing second processing on the to-be-stored image obtained after the enhancement processing through the algorithm module according to the motion vector.

3. The method according to claim 1, wherein the central processing chip comprises an encoder; and the storing the to-be-stored image obtained after the enhancement processing through a memory comprises:

encoding the to-be-stored image obtained after the enhancement processing through the encoder, and storing the encoded to-be-stored image into the memory, wherein the encoder is a video encoder or a picture encoder.

4. The method according to claim 1, wherein the enhancement processing comprises at least one of the following: dynamic range improvement, brightening, noise reduction, frame insertion, and super resolution.

5. A computer software product, wherein the computer program product, when executed by at least one processor, implements the image processing method according to claim 1.

6. A chip, comprising a processor and a communication interface, wherein the communication interface is coupled to the processor, and the processor is configured to run a program or instructions, to implement the image processing method according to claim 1.

7. An electronic device, comprising a processor, a memory, and a program or instructions stored in the memory and executable on the processor, the program or the instructions, when executed by the processor, implementing:

obtaining, through an image sensor, an image acquired in real time;

determining a to-be-stored image and a to-be-previewed image through a central processing chip according to the image acquired in real time;

performing enhancement processing on the to-be-stored image and the to-be-previewed image through an image processing chip, wherein the image processing chip is external to the central processing chip; and storing the to-be-stored image obtained after the enhancement processing through a memory, and displaying the to-be-previewed image obtained after the enhancement processing on a display screen, wherein the central processing chip comprises an image signal processor, and the determining a to-be-stored image and a to-be-previewed image through a central processing chip according to the image acquired in real time comprises:

performing first processing on the image acquired in real time through the image signal processor, to generate the to-be-stored image and the to-be-previewed image.

8. The electronic device according to claim 7, wherein the central processing chip comprises an algorithm module, and the program or the instructions, when executed by the processor, further implementing:

generating a motion vector of the to-be-stored image through the image processing chip; and performing second processing on the to-be-stored image obtained after the enhancement processing through the algorithm module according to the motion vector.

9. The electronic device according to claim 7, wherein the central processing chip comprises an encoder; and the storing the to-be-stored image obtained after the enhancement processing through a memory comprises:

encoding the to-be-stored image obtained after the enhancement processing through the encoder, and storing the encoded to-be-stored image into the memory, wherein the encoder is a video encoder or a picture encoder.

10. The electronic device according to claim 7, wherein the enhancement processing comprises at least one of the following: dynamic range improvement, brightening, noise reduction, frame insertion, and super resolution.

11. A readable storage medium, storing a program or instructions, the program or the instructions, when executed by a processor, implementing:

obtaining, through an image sensor, an image acquired in real time;

determining a to-be-stored image and a to-be-previewed image through a central processing chip according to the image acquired in real time;

performing enhancement processing on the to-be-stored image and the to-be-previewed image through an image processing chip, wherein the image processing chip is external to the central processing chip; and storing the to-be-stored image obtained after the enhancement processing through a memory, and displaying the to-be-previewed image obtained after the enhancement processing on a display screen, wherein the central processing chip comprises an image signal processor, and the determining a to-be-stored image and a to-be-previewed image through a central processing chip according to the image acquired in real time comprises:

performing first processing on the image acquired in real time through the image signal processor, to generate the to-be-stored image and the to-be-previewed image.

12. The readable storage medium according to claim 11, wherein the central processing chip comprises an algorithm module, and the program or the instructions, when executed by the processor, further implementing:

generating a motion vector of the to-be-stored image through the image processing chip; and performing second processing on the to-be-stored image obtained after the enhancement processing through the algorithm module according to the motion vector.

13. The readable storage medium according to claim 11, wherein the central processing chip comprises an encoder; and the storing the to-be-stored image obtained after the enhancement processing through a memory comprises:

encoding the to-be-stored image obtained after the enhancement processing through the encoder, and storing the encoded to-be-stored image into the memory, wherein the encoder is a video encoder or a picture encoder.

14. The readable storage medium according to claim 11, wherein the enhancement processing comprises at least one of the following: dynamic range improvement, brightening, noise reduction, frame insertion, and super resolution.

\* \* \* \* \*